United States Patent
Kim et al.

(10) Patent No.: US 11,593,527 B2
(45) Date of Patent: Feb. 28, 2023

(54) SECURITY CIRCUIT INCLUDING DUAL ENCODER AND ENDECRYPTOR INCLUDING THE SECURITY CIRCUIT

(71) Applicant: SAMSUNG ELECTRONICS CO., LTD., Suwon-si (KR)

(72) Inventors: Jaehyeok Kim, Seoul (KR); Hyesoo Lee, Yongin-si (KR); Hongmook Choi, Bucheon-si (KR); Jisu Kang, Seoul (KR); Hyunil Kim, Seongnam-si (KR); Jonghoon Shin, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 85 days.

(21) Appl. No.: 17/060,099

(22) Filed: Oct. 1, 2020

(65) Prior Publication Data

US 2021/0264061 A1    Aug. 26, 2021

(30) Foreign Application Priority Data

Feb. 26, 2020  (KR) ........................ 10-2020-0023836

(51) Int. Cl.
*G06F 21/72* (2013.01)
*G06F 21/78* (2013.01)
(Continued)

(52) U.S. Cl.
CPC ............ *G06F 21/72* (2013.01); *G06F 21/602* (2013.01); *G06F 21/78* (2013.01); *G11C 8/10* (2013.01)

(58) Field of Classification Search
CPC ........ G06F 21/72; G06F 21/602; G06F 21/78; G11C 8/10; G11C 7/24; H04L 9/06;
(Continued)

(56) References Cited

U.S. PATENT DOCUMENTS 7,386,130 B2   6/2008  Ito et al.
8,155,317 B2   4/2012  Motoyama
(Continued)

FOREIGN PATENT DOCUMENTS

JP       6136325        5/2017
KR    10-2016-0025944   3/2016

OTHER PUBLICATIONS

Matteo-Giaconia- et al., "Area and Power Efficient Synthesis of DPA-Resistant Cryptographic S-Boxes", 20th International Conference on VLSI Design, 2007, 731-737.

*Primary Examiner* — Philip J Chea
*Assistant Examiner* — Sangseok Park
(74) *Attorney, Agent, or Firm* — F. Chau & Associates, LLC

(57) ABSTRACT

A security circuit includes a decoder configured to receive input data and output a decoding signal in response to the input data, a first encoder configured to output one of first phenotypes corresponding to any one among integers in N-decimal (N is a natural number of 1 or more) as a first encoding value in response to the decoding signal, a second encoder configured to output one of second phenotypes corresponding to any one among integers in N-decimal as a second encoding value in response to the decoding signal, and a gate module circuit configured to generate output data by performing a logic operation on the first encoding value and the second encoding value.

18 Claims, 19 Drawing Sheets

(51) Int. Cl.
*G06F 21/60* (2013.01)
*G11C 8/10* (2006.01)

(58) Field of Classification Search
CPC ..... H04L 9/12; H04L 9/0631; H04L 2209/12; H04L 2209/125; H04L 2209/34
See application file for complete search history.

(56) References Cited

U.S. PATENT DOCUMENTS

| | | | |
|---|---|---|---|
| 8,370,642 | B2 | 2/2013 | Nobukata |
| 8,737,603 | B2 | 5/2014 | Shirai et al. |
| 9,798,897 | B2 | 10/2017 | Lee et al. |
| 10,291,390 | B2 | 5/2019 | Choi et al. |
| 2008/0212776 | A1* | 9/2008 | Motoyama ............. H04L 9/003 380/255 |
| 2015/0254476 | A1* | 9/2015 | Lee ....................... G06F 21/72 713/192 |
| 2016/0065361 | A1* | 3/2016 | Choi .................... H04L 9/0631 380/287 |
| 2018/0287779 | A1 | 10/2018 | Lee et al. |

\* cited by examiner

FIG. 7

| Col\Row | C1 | C2 | CE | C4 |
|---|---|---|---|---|
| R1 | 0 x 0 | 0 x 1 | 0 x 2 | 0 x 3 |
| R2 | 0 x 4 | 0 x 5 | 0 x 6 | 0 x 7 |
| R3 | 0 x 8 | 0 x 9 | 0 x A | 0 x B |
| R4 | 0 x C | 0 x D | 0 x E | 0 x F |

FIG. 8

| DV[0]<br>(hexadecimal) | DV[15:0]<br>(binary) | ET1 | ET2 |
|---|---|---|---|
| 0 | 0000_0000_0000_0001 | R1 + C4 (=0x3) | R1 + C4 (=0x3) |
| 1 | 0000_0000_0000_0010 | R1 + C4 (=0x3) | R2 + C3 (=0x6) |
| 2 | 0000_0000_0000_0100 | R1 + C4 (=0x3) | R3 + C2 (=0x9) |
| 3 | 0000_0000_0000_1000 | R1 + C4 (=0x3) | R4 + C1 (=0xC) |
| 4 | 0000_0000_0001_0000 | R2 + C3 (=0x6) | R1 + C4 (=0x3) |
| 5 | 0000_0000_0010_0000 | R2 + C3 (=0x6) | R2 + C3 (=0x6) |
| 6 | 0000_0000_0100_0000 | R2 + C3 (=0x6) | R3 + C2 (=0x9) |
| 7 | 0000_0000_1000_0000 | R2 + C3 (=0x6) | R4 + C1 (=0xC) |
| 8 | 0000_0001_0000_0000 | R3 + C2 (=0x9) | R1 + C4 (=0x3) |
| 9 | 0000_0010_0000_0000 | R3 + C2 (=0x9) | R2 + C3 (=0x6) |
| A | 0000_0100_0000_0000 | R3 + C2 (=0x9) | R3 + C2 (=0x9) |
| B | 0000_1000_0000_0000 | R3 + C2 (=0x9) | R4 + C1 (=0xC) |
| C | 0001_0000_0000_0000 | R4 + C1 (=0xC) | R1 + C4 (=0x3) |
| D | 0010_0000_0000_0000 | R4 + C1 (=0xC) | R2 + C3 (=0x6) |
| E | 0100_0000_0000_0000 | R4 + C1 (=0xC) | R3 + C2 (=0x9) |
| F | 1000_0000_0000_0000 | R4 + C1 (=0xC) | R4 + C1 (=0xC) |

FIG. 10

| DV[0] (hexadecimal) | DV[15:0] (binary) | 8bit S-Box ||| 
|---|---|---|---|---|
| | | ET1(EN1[7:4] or EN2[7:4]) | ET2(EN1[3:0] or EN2[3:0]) | EN1[7:0] (or EN2[7:0]) |
| 0 | 0000_0000_0000_0001 | R1 + C4 (=0x3) | R1 + C4 (=0x3) | 0x33 |
| 1 | 0000_0000_0000_0010 | R1 + C4 (=0x3) | R2 + C3 (=0x6) | 0x36 |
| 2 | 0000_0000_0000_0100 | R1 + C4 (=0x3) | R3 + C2 (=0x9) | 0x39 |
| 3 | 0000_0000_0000_1000 | R1 + C4 (=0x3) | R4 + C1 (=0xC) | 0x3C |
| 4 | 0000_0000_0001_0000 | R2 + C3 (=0x6) | R1 + C4 (=0x3) | 0x63 |
| 5 | 0000_0000_0010_0000 | R2 + C3 (=0x6) | R2 + C3 (=0x6) | 0x66 |
| 6 | 0000_0000_0100_0000 | R2 + C3 (=0x6) | R3 + C2 (=0x9) | 0x69 |
| 7 | 0000_0000_1000_0000 | R2 + C3 (=0x6) | R4 + C1 (=0xC) | 0x6C |
| 8 | 0000_0001_0000_0000 | R3 + C2 (=0x9) | R1 + C4 (=0x3) | 0x93 |
| 9 | 0000_0010_0000_0000 | R3 + C2 (=0x9) | R2 + C3 (=0x6) | 0x96 |
| A | 0000_0100_0000_0000 | R3 + C2 (=0x9) | R3 + C2 (=0x9) | 0x99 |
| B | 0000_1000_0000_0000 | R3 + C2 (=0x9) | R4 + C1 (=0xC) | 0x9C |
| C | 0001_0000_0000_0000 | R4 + C1 (=0xC) | R1 + C4 (=0x3) | 0xC3 |
| D | 0010_0000_0000_0000 | R4 + C1 (=0xC) | R2 + C3 (=0x6) | 0xC6 |
| E | 0100_0000_0000_0000 | R4 + C1 (=0xC) | R3 + C2 (=0x9) | 0xC9 |
| F | 1000_0000_0000_0000 | R4 + C1 (=0xC) | R4 + C1 (=0xC) | 0xCC |

FIG. 11

| Combination₁ | EN1[7:4] or EN1[3:0] | | | | EN2[7:4] or EN2[3:0] | | | |
|---|---|---|---|---|---|---|---|---|
| 1-1 | 1 | 5 | 9 | D | 3 | 5 | A | C |
| 1-2 | 1 | 6 | A | D | 3 | 5 | A | C |
| 1-3 | 2 | 5 | 9 | E | 3 | 5 | A | C |
| 1-4 | 2 | 6 | A | E | 3 | 5 | A | C |
| 1-5 | 1 | 5 | 9 | D | 3 | 6 | 9 | C |
| 1-6 | 1 | 6 | A | D | 3 | 6 | 9 | C |
| 1-7 | 2 | 5 | 9 | E | 3 | 6 | 9 | C |
| 1-8 | 2 | 6 | A | E | 3 | 6 | 9 | C |
| 1-9 | 1 | 4 | 9 | C | 3 | 7 | 9 | D |
| 1-10 | 1 | 5 | 8 | C | 3 | 5 | B | D |
| 1-11 | 2 | 4 | A | C | 3 | 7 | A | E |
| 1-12 | 2 | 6 | 8 | C | 3 | 6 | B | E |

FIG. 12

| Combination 2 | EN1[7:4] or EN1[3:0] | | | | EN2[7:4] or EN2[3:0] | | | |
|---|---|---|---|---|---|---|---|---|
| 2-1 | 4 | 5 | 6 | 7 | 3 | 5 | A | C |
| 2-2 | 4 | 7 | 9 | A | 3 | 5 | A | C |
| 2-3 | 5 | 6 | 8 | B | 3 | 5 | A | C |
| 2-4 | 8 | 9 | A | B | 3 | 5 | A | C |
| 2-5 | 4 | 5 | 6 | 7 | 3 | 6 | 9 | C |
| 2-6 | 4 | 7 | 9 | A | 3 | 6 | 9 | C |
| 2-7 | 5 | 6 | 8 | B | 3 | 6 | 9 | C |
| 2-8 | 8 | 9 | A | B | 3 | 6 | 9 | C |
| 2-9 | 1 | 3 | 4 | 6 | 6 | 7 | C | D |
| 2-10 | 1 | 3 | 8 | A | A | B | C | D |
| 2-11 | 2 | 3 | 4 | 5 | 5 | 7 | C | E |
| 2-12 | 2 | 3 | 8 | 9 | 9 | B | C | E |

FIG. 13

| Combination 3 | EN1[7:4] or EN1[3:0] | | | | EN2[7:4] or EN2[3:0] | | | |
|---|---|---|---|---|---|---|---|---|
| 3-1 | 1 | 6 | B | C | 3 | 5 | A | C |
| 3-2 | 2 | 7 | 9 | C | 3 | 5 | A | C |
| 3-3 | 3 | 4 | 9 | E | 3 | 5 | A | C |
| 3-4 | 3 | 6 | 8 | D | 3 | 5 | A | C |
| 3-5 | 1 | 7 | A | C | 3 | 6 | 9 | C |
| 3-6 | 2 | 5 | B | C | 3 | 6 | 9 | C |
| 3-7 | 3 | 5 | 8 | E | 3 | 6 | 9 | C |
| 3-8 | 3 | 4 | A | D | 3 | 6 | 9 | C |
| 3-9 | 1 | 6 | B | C | 2 | 7 | 9 | C |
| 3-10 | 3 | 4 | 9 | E | 2 | 7 | 9 | C |
| 3-11 | 3 | 4 | 9 | E | 3 | 6 | 8 | D |
| 3-12 | 1 | 6 | B | C | 3 | 6 | 8 | D |
| 3-13 | 1 | 7 | A | C | 2 | 5 | B | C |
| 3-14 | 3 | 5 | 8 | E | 2 | 5 | B | C |
| 3-15 | 3 | 5 | 8 | E | 3 | 4 | A | D |
| 3-16 | 1 | 7 | A | C | 3 | 4 | A | D |

FIG. 14A

| Combination 3 | | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| | | (EN1[7:4]) XOR (EN2[7:4]) | (EN1[3:0]) XOR (EN2[3:0]) | | | | | | | | | | | | | | |
| 3-1 | Encoder1 | C | B | 1 | 6 | 1 | 6 | C | B | 8 | 9 | A | 1 | 6 | 1 | B | C |
| | Encoder2 | C | A | 3 | 5 | 5 | 3 | A | C | 3 | 5 | C | A | 5 | C | 5 | 3 |
| 3-2 | Encoder1 | C | 2 | 7 | 9 | 7 | 9 | 2 | 2 | 2 | C | 9 | 7 | 9 | 7 | 2 | C |
| | Encoder2 | 3 | 3 | 5 | A | 3 | C | A | 5 | A | 5 | 3 | C | 5 | A | C | 3 |
| 3-3 | Encoder1 | 3 | 4 | E | A | E | C | 3 | 5 | 4 | 3 | 3 | C | 5 | A | 4 | 3 |
| | Encoder2 | 3 | 5 | C | 9 | A | 9 | 5 | 3 | C | A | 9 | E | 9 | 3 | A | 3 |
| 3-4 | Encoder1 | 3 | D | C | 8 | A | 6 | 5 | D | D | 3 | 6 | 3 | 6 | 8 | D | 3 |
| | Encoder2 | 3 | C | A | 5 | C | 3 | 3 | A | 5 | A | 6 | 3 | A | 5 | 3 | 3 |
| 3-5 | Encoder1 | 3 | C | A | 5 | C | 9 | A | 1 | 1 | A | 9 | C | A | 1 | 7 | C |
| | Encoder2 | C | 7 | 1 | A | 7 | 9 | C | 6 | 9 | 3 | 3 | 7 | C | C | 9 | 3 |
| 3-6 | Encoder1 | C | 6 | 3 | 5 | 3 | 6 | 5 | 6 | 9 | 5 | 6 | 2 | 6 | B | 2 | C |
| | Encoder2 | C | 2 | B | 6 | 2 | 9 | 3 | B | 3 | C | C | 9 | 5 | 6 | C | 3 |
| 3-7 | Encoder1 | 3 | 3 | 9 | 6 | 6 | 9 | 3 | 9 | 6 | C | 6 | 9 | 9 | 3 | 6 | 3 |
| | Encoder2 | 3 | 8 | E | A | 8 | 3 | 5 | E | E | 3 | 3 | 8 | 5 | E | 8 | 3 |
| 3-8 | Encoder1 | 3 | D | 4 | 9 | 9 | 6 | A | 4 | C | 9 | 9 | 6 | 6 | 4 | D | 3 |
| | Encoder2 | 3 | C | 6 | 9 | 9 | 6 | C | 3 | C | 3 | 9 | 6 | 6 | 9 | 3 | 3 |

FIG. 14B

| Combinations | | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| | | (EN1[7:4]) XOR (EN2[7:4])  \|  (EN1[3:0]) XOR (EN2[3:0]) | | | | | | | | | | | | | | | |
| 3-9 | Encoder1 | C | 6 | B | 1 | 6 | C | 1 | B | 1 | B | 6 | C | B | 1 | C | 6 |
| | Encoder2 | C | 7 | 9 | 2 | 2 | 9 | 7 | C | 9 | 2 | C | 7 | 7 | C | 2 | 9 |
| 3-10 | Encoder1 | 9 | 3 | E | 4 | 3 | 9 | 4 | E | 4 | E | 9 | 3 | E | 4 | 3 | 9 |
| | Encoder2 | 9 | 2 | C | 7 | 7 | C | 2 | 9 | C | 7 | 9 | 2 | 2 | 9 | 7 | C |
| 3-11 | Encoder1 | 3 | 9 | 4 | E | 9 | 3 | E | 4 | E | 4 | 3 | 9 | 4 | E | 3 | 9 |
| | Encoder2 | 3 | 8 | 6 | D | D | 6 | 8 | 3 | 6 | D | 3 | 8 | 8 | 3 | D | 6 |
| 3-12 | Encoder1 | 6 | C | 1 | B | C | 6 | B | 1 | B | 1 | 6 | C | 1 | B | 6 | C |
| | Encoder2 | 6 | D | 3 | 8 | 8 | 3 | D | 6 | 3 | 8 | 6 | D | D | 6 | 8 | 3 |
| 3-13 | Encoder1 | C | A | 7 | 1 | 1 | 7 | A | C | 7 | 1 | C | A | A | C | 1 | 7 |
| | Encoder2 | C | B | 5 | 2 | 5 | 2 | C | B | 2 | 5 | B | C | 5 | 2 | C | B |
| 3-14 | Encoder1 | 5 | 3 | E | 8 | 8 | E | 3 | 5 | E | 8 | 5 | 3 | 3 | 5 | 8 | E |
| | Encoder2 | 5 | 2 | C | B | C | B | 5 | 2 | B | C | 2 | 5 | 5 | 2 | B | C |
| 3-15 | Encoder1 | 3 | 4 | A | D | A | D | 3 | 4 | D | A | 4 | 3 | 3 | 4 | D | A |
| | Encoder2 | 3 | C | 1 | 7 | 7 | 1 | C | 3 | 1 | 7 | 7 | 1 | C | 3 | A | C |
| 3-16 | Encoder1 | A | D | 3 | 4 | 3 | 4 | A | D | 4 | 3 | D | A | A | D | 4 | 3 |
| | Encoder2 | A | 4 | 3 | 4 | 3 | 4 | A | A | C | 3 | A | 4 | 7 | A | 4 | 3 |

FIG. 15

| DV[0] | Combination 3-7 | | | | | Combination 3-15 | | | | |
|---|---|---|---|---|---|---|---|---|---|---|
| | EN1 | EN2 | HW(EN1) | HW(EN2) | HW(EN1)+HW(EN2) | EN1 | EN2 | HW(EN1) | HW(EN2) | HW(EN1)+HW(EN2) |
| 0 | 0x3 | 0x3 | 2 | 2 | 4 | 0x3 | 0x3 | 2 | 2 | 4 |
| 1 | 0x8 | 0x9 | 1 | 2 | 3 | 0x5 | 0x4 | 2 | 1 | 3 |
| 2 | 0xE | 0xC | 3 | 2 | 5 | 0x8 | 0xA | 1 | 2 | 3 |
| 3 | 0x5 | 0x6 | 2 | 2 | 4 | 0xE | 0xD | 3 | 3 | 6 |
| 4 | 0x8 | 0xC | 1 | 2 | 3 | 0xE | 0xA | 3 | 2 | 5 |
| 5 | 0x3 | 0x6 | 2 | 2 | 4 | 0x8 | 0xD | 1 | 3 | 4 |
| 6 | 0x5 | 0x3 | 2 | 2 | 4 | 0x5 | 0x3 | 2 | 2 | 4 |
| 7 | 0xE | 0x9 | 3 | 2 | 5 | 0x3 | 0x4 | 2 | 1 | 3 |
| 8 | 0xE | 0x6 | 3 | 2 | 5 | 0x5 | 0xD | 2 | 3 | 5 |
| 9 | 0x5 | 0xC | 2 | 2 | 4 | 0x3 | 0xA | 2 | 2 | 4 |
| A | 0x3 | 0x9 | 2 | 2 | 4 | 0xE | 0x4 | 3 | 1 | 4 |
| B | 0x8 | 0x3 | 1 | 2 | 3 | 0x8 | 0x3 | 1 | 2 | 3 |
| C | 0x5 | 0x9 | 2 | 2 | 4 | 0xE | 0x4 | 3 | 1 | 2 |
| D | 0xE | 0x3 | 3 | 2 | 5 | 0xE | 0x3 | 3 | 2 | 5 |
| E | 0x8 | 0x6 | 1 | 2 | 3 | 0x3 | 0xD | 2 | 3 | 5 |
| F | 0x3 | 0xC | 2 | 2 | 4 | 0x5 | 0xA | 2 | 2 | 4 | ary embodiments of the inventive concept relate
SECURITY CIRCUIT INCLUDING DUAL ENCODER AND ENDECRYPTOR INCLUDING THE SECURITY CIRCUIT

CROSS-REFERENCE TO RELATED APPLICATION

This application claims priority under 35 U.S.C. 119 to Korean Patent Application No. 10-2020-0023836, filed on Feb. 26, 2020 in the Korean Intellectual Property Office, the disclosure of which is incorporated by reference herein in its entirety.

TECHNICAL FIELD

Exemplary embodiments of the inventive concept relate to a security circuit, and more particularly, to a security circuit including a substitution box (S-box) in which two encoders share one decoder, and an endecryptor including the S-box.

DISCUSSION OF RELATED ART

Personalized electronic devices include security information about a user. To prevent the security information about the user from being leaked by hacking, a hardware encryption/decryption device (e.g., an endecryptor) may transmit the security information through a signature or authentication procedure as a cryptogram.

Encryption technology is frequently used to ensure the safety of data transmission. Encryption technology encrypts plain text on a transmitting side and decrypts cipher text on a receiving side. Encryption of the plain text and decryption of the cipher text are known as encryption technologies.

Because an encryption operation is generally slow, the encryption operation is often implemented in hardware to be applied to devices such as smart cards. A block cipher algorithm may include data encryption standard (DES), advanced encryption standard (AES), SEED, ARIA, SM4, or the like.

In the implementation of an encryption/decryption operator, applying a prevention technique against a side channel attack is important. As a technique for preventing side channel attacks, a method of randomly or uniformly displaying power and electromagnetic waves, which are information collected through the side channel, may be used.

In the case of a block encryption algorithm, the S-box may be the main target of an attack. Security of the encryption/decryption operator may be determined based on the security of a substitution operation performed in the S-box. When the security is improved by duplication of the S-box, a side channel attack may be difficult, but redundant logic, such as duplicate usage of a decoder logic, may be increased.

SUMMARY

According to an exemplary embodiment of the inventive concept, a security circuit may include a decoder configured to receive input data and output a decoding signal in response to the input data, a first encoder configured to output one of first phenotypes corresponding to any one among integers in N-decimal (N is a natural number of 1 or more) as a first encoding value in response to the decoding signal, a second encoder configured to output one of second phenotypes corresponding to any one among integers in N-decimal as a second encoding value in response to the decoding signal, and a gate module circuit configured to generate output data by performing a logic operation on the first encoding value and the second encoding value.

According to an exemplary embodiment of the inventive concept, a security circuit may include a first permutation logic circuit configured to output a first decoding value, a second permutation logic circuit configured to output a second decoding value, a first encoder including a plurality of first row gates configured to receive the first decoding value, where the first encoder is assigned with first phenotypes based on a certain Hamming weight value as an output of the plurality of first row gates and is configured to output one of the first phenotypes assigned to one of the plurality of first row gates as a first encoding value in response to a binary number having a bit value of 1, and a second encoder including a plurality of second row gates configured to receive the second decoding value, where the second encoder is assigned with second phenotypes based on a certain Hamming weight value as an output of the plurality of second row gates and is configured to output one of the second phenotypes assigned to one of the plurality of second row gates as a second encoding value in response to a binary number having a bit value of 1.

According to an exemplary embodiment of the inventive concept, an endecryptor may include an input terminal configured to receive input data from an external device, an S-box configured to generate output data encoded or decoded from the input data received via the input terminal, and an output terminal configured to output the output data. The S-box further includes a decoder configured to output a decoding signal in response to the input data, a first encoder configured to output one of first phenotypes corresponding to any one among integers in N-decimal (N is a natural number of 1 or more) as a first encoding value in response to the decoding signal, and a second encoder configured to output one of second phenotypes corresponding to any one among integers in N-decimal as a second encoding value in response to the decoding signal. The output data is a result of a logic operation performed on the first encoding value and the second encoding value.

According to an exemplary embodiment of the inventive concept, an S-box may include a decoder configured to receive input data and inverted input data, and output decoding signals based on the input data and the inverted input data, a first permutation logic circuit configured to select one of integers in a first integer group to transmit as a first decoding value, in response to the decoding signals, a second permutation logic circuit configured to select one of integers in a second integer group to transmit as a second decoding value, in response to the decoding signals, a first encoding module circuit configured to receive the first decoding value and output a first encoding value in response to the first decoding value, a second encoding module circuit configured to receive the second decoding value and output a second encoding value in response to the second decoding value, and a plurality of logic gates configured to receive the first and second encoding values and generate output data.

BRIEF DESCRIPTION OF THE DRAWINGS

The above and other features of the inventive concept will be more clearly understood by describing in detail exemplary embodiments thereof with reference to the accompanying drawings.

FIG. 7 is a table illustrating encoding values according to an exemplary embodiment of the inventive concept.

FIG. 8 is a table illustrating a first encoding value and a second encoding value, according to an exemplary embodiment of the inventive concept.

FIG. 10 is a table describing a first encoding value and a second encoding value, according to an exemplary embodiment of the inventive concept.

FIG. 11 is a table describing a first combination set of phenotypes, according to an exemplary embodiment of the inventive concept.

FIG. 12 is a table describing a second combination set of phenotypes, according to an exemplary embodiment of the inventive concept.

FIG. 13 is a table describing a third combination set of phenotypes, according to an exemplary embodiment of the inventive concept.

FIGS. 14A and 14B are tables describing output data that are XOR-operated based on encoding values of phenotypes in FIG. 13 according to an exemplary embodiment of the inventive concept.

FIG. 15 is a table for describing Hamming weights of first and second encoding values having the phenotypes in FIG. 13 according to an exemplary embodiment of the inventive concept.

DETAILED DESCRIPTION OF THE EMBODIMENTS

Figure 1:
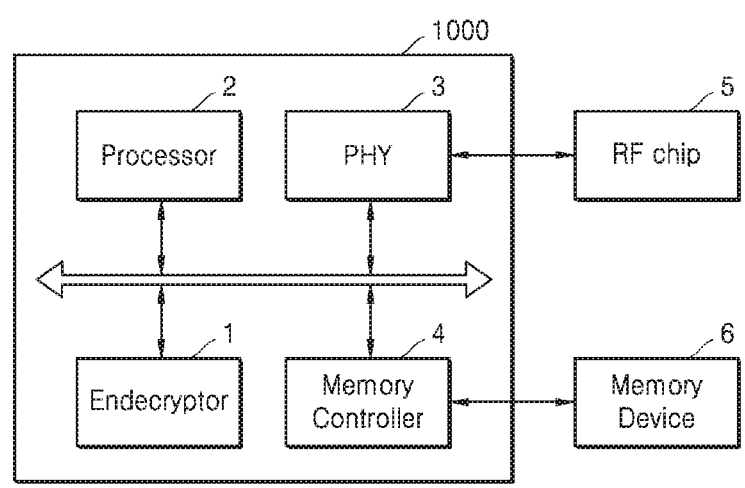
FIG. 1 is a block diagram illustrating an electronic device according to an exemplary embodiment of the inventive concept.

Exemplary embodiments of the inventive concept implement an S-box having a small area in which two encoders share one decoder, and provide an S-box preventing a side channel attack by uniformly adjusting Hamming weights of output data and an endecryptor including the S-box.

Hereinafter, exemplary embodiments of the inventive concept will be described in detail with reference to the accompanying drawings. Like reference numerals may refer to like elements throughout this application.

FIG. 1 is a block diagram illustrating an electronic device according to an exemplary embodiment of the inventive concept.

Referring to FIG. 1, an electronic device 1000 may control a smart card, a memory card, or the like, and for example, the electronic device 1000 may include an application processor.

The electronic device 1000 may include an endecryptor 1, a processor 2, a physical layer (PHY) 3, and a memory controller 4. The processor 2 may perform data transmission and reception with a radio frequency (RF) chip 5 via the PHY 3. In addition, the processor 2 may execute a task and store a result thereof in a memory device 6 by using a control of the memory controller 4. For example, the processor 2 may include at least one core.

The endecryptor 1 may encrypt or decrypt data transmitted from an external device (for example, the RF chip 5 and/or the memory device 6) to the electronic device 1000, or may encrypt or decrypt data to be output from the electronic device 1000 to the external device. The endecryptor 1 may encrypt or decrypt at least a portion of data for an operation of the electronic device 1000 to improve the security of the electronic device 1000.

Figure 2:
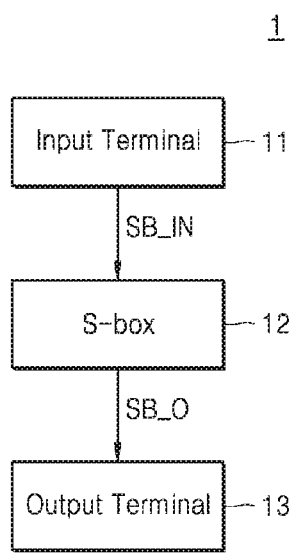
FIG. 2 is a block diagram illustrating an endecryptor of FIG. 1 according to an exemplary embodiment of the inventive concept.

FIG. 2 is a block diagram illustrating an endecryptor of FIG. 1 according to an exemplary embodiment of the inventive concept.

Referring to FIG. 2, the endecryptor 1 may include an input terminal 11, a substitution-box (S-box) 12, and an output terminal 13.

The endecryptor 1 according to an exemplary embodiment of the inventive concept may encrypt data received by the electronic device 1000. In addition, the endecryptor 1 may decrypt encrypted data. For example, the endecryptor 1 may provide the received data to the S-box 12. In this case, the S-box 12 may receive input data SB_IN via the input terminal 11. The S-box 12 may substitute the input data SB_IN with output data SB_O by a certain substitution operation. The S-box 12 may generate the output data SB_O encoded or decoded from the input data SB_IN received via the input terminal 11. The S-box 12 may output the output data SB_O, including bits different from at least some bits of the input data SB_IN, to an external device. For example, the input data SB_IN and the output data SB_O may be mapped one-to-one, and the number of bits (for example, 8 bits) of the input data SB_IN may be the same as that (for example, 8 bits) of the output data SB_O. First phenotypes and second phenotypes, which will be described in detail below, may be preset so that the input data SB_IN and the output data SB_O are mapped one-to-one. Hereinafter, the S-box 12 may be referred to as a security circuit as the S-box performs a security operation.

Figure 3:
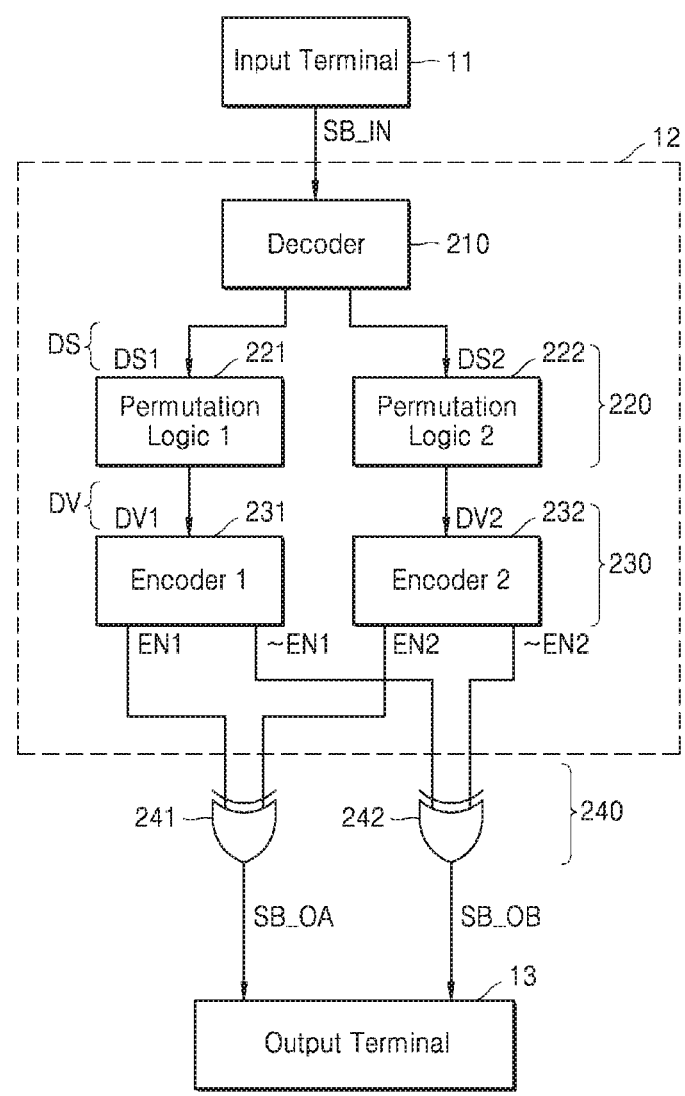
FIG. 3 is a block diagram illustrating an S-box of FIG. 2 according to an exemplary embodiment of the inventive concept.

FIG. 3 is a block diagram illustrating an S-box of FIG. 2 according to an exemplary embodiment of the inventive concept.

Referring to FIG. 3, the endecryptor 1 may include the input terminal 11, the S-box 12, a gate module 240, and the output terminal 13. The S-box 12 may include a decoder 210, a permutation module 220, and an encoder module 230, and the gate module 240 may include a first XOR gate 241 and a second XOR gate 242. The permutation module 220 may include a first permutation logic 221 and a second permutation logic 222, and the encoder module 230 may include a first encoder 231 and a second encoder 232. On the other hand, unlike as illustrated in FIG. 3, the gate module 240 may be included in the S-box 12. Components of the endecryptor 1 may be circuits, which will be described in detail below.

The decoder 210 may receive the input data SB_IN from the input terminal 11 and output decoding signals based on or in response to the input data SB_IN. The decoding signals may include a first decoding signal DS1 and a second decoding signal DS2. The first and second decoding signals DS1 and DS2 may be referred to as decoding signals DS.

The permutation module 220 may receive the first and second decoding signals DS1 and DS2 from the decoder 210, and output a first decoding value DV1 and a second decoding value DV2 based on or in response to the received first and second decoding signals DS1 and DS2. The first and second decoding values DV1 and DV2 may be referred to as decoding values DV. In other words, the first and second permutation logics 221 and 222 may output the first and second decoding values DV1 and DV2 based on the first and second decoding signals DS1 and DS2, respectively. The first decoding value DV1 may be a value indicated by the first decoding signal DS1. For example, in response to the first decoding signal DS1 output from a first AND gate among a plurality of AND gates included in the decoder 210, the first permutation logic 221 may output the first decoding value DV1. In this case, the first decoding value DV1 may be one of hexadecimal values 0, 1, . . . , E, and F (for example, E in hexadecimal means 14). Similar to the case described above, in response to the second decoding signal DS2 output from a second AND gate among the plurality of AND gates included in the decoder 210, the second permutation logic 222 may output the second decoding value DV2. In this case, the second decoding value DV2 may be one of the hexadecimal values.

The encoder module 230 may output a first encoding value EN1 and a second encoding value EN2 and a first inverted encoding value ~EN1 and a second inverted encoding value ~EN2 based on or in response to the first and second decoding values DV1 and DV2 received from the permutation module 220. The first and second inverted encoding values ~EN1 and ~EN2 may be data in which the first and second encoding values EN1 and EN2 have been inverted, respectively. For example, when the first encoding value EN1 is '0100' as a binary number, the first inverted encoding value ~EN1 may be '1011' as a binary number.

The first encoder 231 may convert the first decoding value DV1 into one of first phenotypes and may output the converted value as the first encoding value EN1. In addition, the second encoder 232 may convert the second decoding value DV2 into one of second phenotypes and may output the converted value as the second encoding value EN2. The first phenotypes and the second phenotypes may be values that are mapped to the first decoding value DV1 and the second decoding value DV2, respectively. In addition, the first phenotype and the second phenotype may correspond to any one of integers in N-decimal (where N is a natural number of one or more). For example, the first decoding value DV1 may be 4, which is one of 16 values that can be expressed in hexadecimal, and the second decoding value DV2 may be A, which is also one of 16 values that can be expressed in hexadecimal. The first phenotypes may include 3, 5, A, and C in hexadecimal, and the second phenotypes may include 3, 6, 9, and C in hexadecimal. In this case, the first encoder 231 may convert the first decoding value DV1, that is 4, into 5 that is one of the first phenotypes corresponding to 4, and may output 5 as the first encoding value EN1. In addition, the second encoder 232 may convert the second decoding value DV2, that is A, into 9 that is one of the second phenotypes corresponding to A. In this manner, the first encoder 231 may select one of the first phenotypes based on the first decoding value DV1 and may output the selected first phenotype as the first encoding value EN1. In addition, the second encoder 232 may select one of the second phenotypes based on the second decoding value DV2 and may output the selected second phenotype as the second encoding value EN2.

The gate module 240 may generate first output data SB_OA by using logic operations on the first and second encoding values EN1 and EN2 and may output second output data SB_OB based on or in response to the first and second inverted encoding values ~EN1 and ~EN2. For example, the first XOR gate 241 may perform the XOR operation on the first and second encoding values EN1 and EN2 and output the XOR-operated data as the first output data SB_OA. In addition, the second XOR gate 242 may perform the XOR operation on the first and second inverted encoding values ~EN1 and ~EN2 and output the XOR-operated data as the second output data SB_OB. Because the first output data SB_OA and the second output data SB_OB are XOR-operated normal data and inverted data, respectively, they may be the same as each other.

The output terminal 13 may receive the first output data SB_OA and the second output data SB_OB. For example, the output terminal 13 may output transmission data including the first output data SB_OA as upper bits and the second output data SB_OB as lower bits. For example, the transmission data may have the same number of bits as the input data SB_IN.

Figure 4:
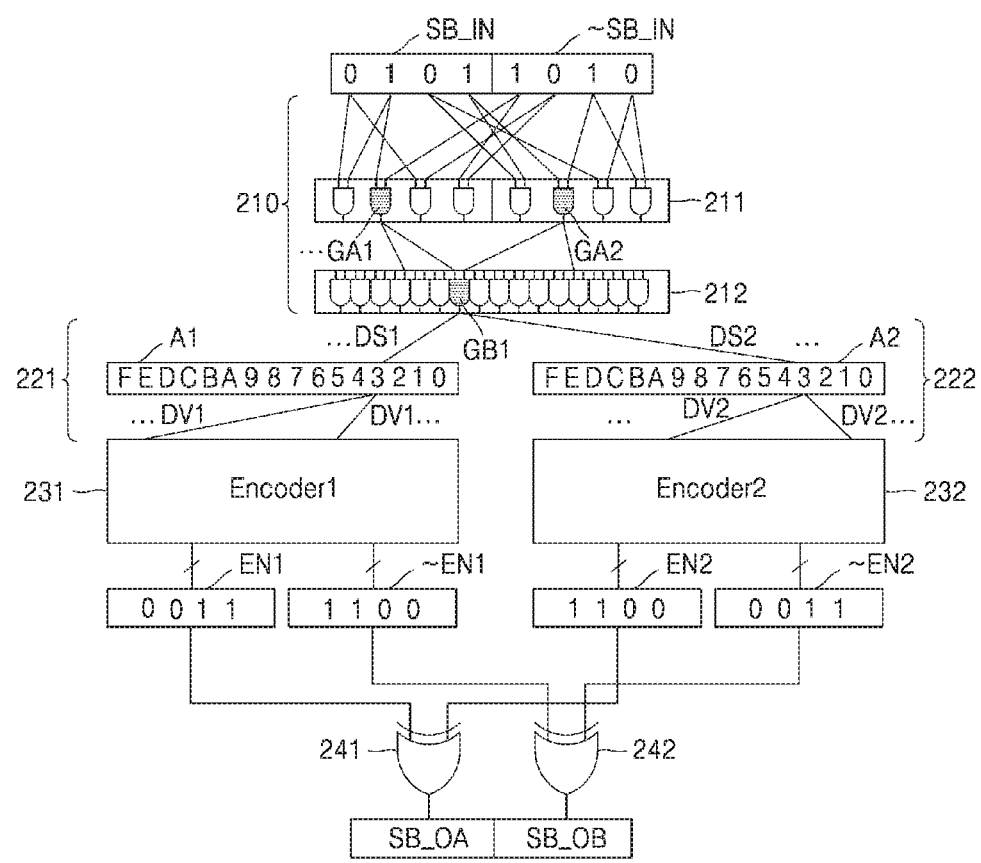
FIG. 4 is a block diagram illustrating the S-box of FIG. 3 according to an exemplary embodiment of the inventive concept.

FIG. 4 is a block diagram illustrating the S-box of FIG. 3 according to an exemplary embodiment of the inventive concept. Hereinafter, descriptions are given with reference to reference numerals in FIG. 3.

Referring to FIG. 4, the decoder 210 may include a first input gate module 211 and a second input gate module 212. The first permutation logic 221 may include a first index unit A1, and the second permutation logic 222 may include a second index unit A2.

According to an exemplary embodiment of the inventive concept, the input data SB_IN may be bx0101, and inverted input data ~SB_IN may be bx1010. The first input gate module 211 may include a plurality of AND gates, and each of the plurality of AND gates may receive different data bits from each other via two input terminals. For example, each of the input terminals of the AND gates may receive a data bit of the input data SB_IN and/or a data bit of the inverted input data ~SB_IN. For example, the first input gate module 211 may include a first AND gate GA1 and a second AND gate GA2. Input terminals of the first AND gate GA1 may receive the input data SB_IN and the inverted input data ~SB_IN of a bit value of 1, and an output terminal of the first AND gate GA1 outputs bit values of 1. In addition, input terminals of the second AND gate GA2 may also receive bit values of 1, and output bit values of 1. The number of AND gates included in the first input gate module 211 may be equal to a sum of the number of bits of the input data SB_IN and the number of bits of the inverted input data ~SB_IN.

According to an exemplary embodiment of the inventive concept, the second input gate module 212 may include a plurality of AND gates, and the plurality of AND gates of the second input gate module 212 may receive bit values from the first input gate module 211. In other words, each AND gate included in the second input gate module 212 may receive bit values from two AND gates among the AND gates included in the first input gate module 211. For example, each AND gate included in the first input gate module 211 may be connected to two AND gates among the AND gates included in the second input gate module 212 via two output lines.

According to an exemplary embodiment of the inventive concept, the plurality of AND gates of the second input gate module 212 may output the first and second decoding signals DS1 and DS2. The first decoding signal DS1 and the second decoding signal DS2 may have bit values of 0 or 1.

As an example, the second input gate module 212 may select one of indexes of the first index unit A1 (for example, 3) and one of indexes of the second index unit A2 (for example, 3), by outputting the first and second decoding signals DS1 and DS2 having a bit value of 1. As another example, the second input gate module 212 may not select other indexes among the indexes of the first index unit A1 (for example, 0 to 2 and 4 to F) and other indexes among the indexes of the second index unit A2 (for example, 0 to 2 and 4 to F), by outputting decoding signals having a bit value of 0.

The permutation logic 221 may output the first decoding value DV1. The first decoding value DV1 may include a bit value of 1 for the selected indexes (for example, 3) and a bit value of 0 for non-selected indexes (for example, 0 to 2 and 4 to F). The second decoding value DV2 may also include a bit value of 1 for the selected indexes (for example, 3) and a bit value of 0 for the non-selected indexes (for example, 0 to 2 and 4 to F). For example, the first and second decoding values DV1 and DV2 may include data in which a bit value of 0 or 1 is recorded in each of a plurality of indexes. For example, the first and second decoding values DV1 and DV2 may include data including a bit value of 1 in one index and a bit value of 0 at the other indexes.

Referring to FIG. 4, the second input gate module 212 may select the same indexes (for example, 3) in the first and second index units A1 and A2. However, the inventive concept is not limited thereto, and the second input gate module 212 may select different indexes from the first and second index units A1 and A2.

According to an exemplary embodiment of the inventive concept, each of the first and second encoders 231 and 232 may receive decoding values indicating the same integer, but may receive them via different receiving members included in each of the first and second encoders 231 and 232. For example, even though the first and second encoders 231 and 232 receive the first and second decoding values DV1 and DV2 representing 3, respectively, the first encoder 231 may output the first encoding value EN1 of bx0011, and the second encoder 232 may output the second encoding value EN2 of bx1100 different from the first encoding value EN1. The first encoder 231 may output the first inverted encoding value ~EN1 including bx1100 in which the first encoding value EN1 has been inverted, and the second encoder 232 may output the second encoding value EN2 including bx0011 in which the second encoding value EN2 has been inverted.

The first XOR gate 241 may output the first output data SB_OA by performing the XOR operation on the first and second encoding values EN1 and EN2. In addition, the second XOR gate 242 may output the second output data SB_OB by performing the XOR operation on the first and second inverted encoding values ~EN1 and ~EN2.

Figure 5:
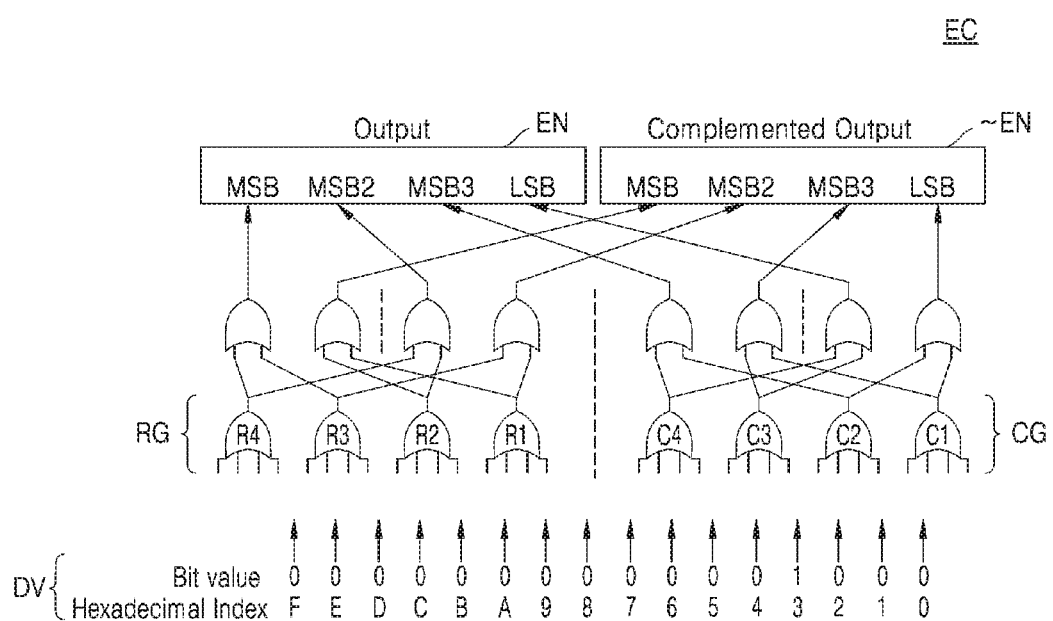
FIG. 5 is a circuit diagram illustrating an encoder circuit according to an exemplary embodiment of the inventive concept.

FIG. 5 is a circuit diagram illustrating an encoder circuit according to an exemplary embodiment of the inventive concept. Hereinafter, descriptions are given with reference to reference numerals in FIG. 4.

Referring to FIG. 5, an encoder circuit EC may be a digital circuit of the first and second encoders 231 and 232 described above. The encoder circuit EC may include a plurality of row gates RG and a plurality of column gates CG. The plurality of row gates RG may include a first row gate R1, a second row gate R2, a third row gate R3, and a fourth row gate R4, each of the plurality of row gates RG may be implemented with an OR gate, and each of the plurality of row gates RG may include a plurality of input terminals (for example, four input terminals). In addition, the plurality of column gates CG may include a first column gate C1, a second column gate C2, a third column gate C3, and a fourth column gate C4, each of the plurality of column gates CG may be implemented with an OR gate, and each of the plurality of column gates CG may include a plurality of input terminals (for example, four input terminals).

According to an exemplary embodiment of the inventive concept, the encoding circuit EC may be included in the first encoder 231. In this case, an encoding value EN output by the encoding circuit EC may be the first encoding value EN1. As another example, the encoding circuit EC may be included in the second encoder 232. In this case, the encoding value EN output by the encoding circuit EC may be the second encoding value EN2.

The encoding circuit EC may output various types of encoding values. A first encoding circuit EC1 of FIG. 6A may output a first-type encoding value (ET1 of FIG. 6A) and may output the first-type encoding value ET1, for example, as the first encoding value EN1, and as another example, may output a second-type encoding value (ET2 in FIG. 6B) as the first encoding value EN1. Details are described later with reference to FIGS. 6A and 6B.

The plurality of indexes of the decoding value DV may be assigned to the plurality of input terminals (for example, 16 input terminals) of the row gates RG in a certain combination. In addition, the plurality of indexes of the decoding value DV may be assigned to the plurality of input terminals (for example, 16 input terminals) of the column gates CG in the same combination as the certain combination or in a different combination. Details are described later with reference to FIGS. 6A and 6B.

Figure 6A:
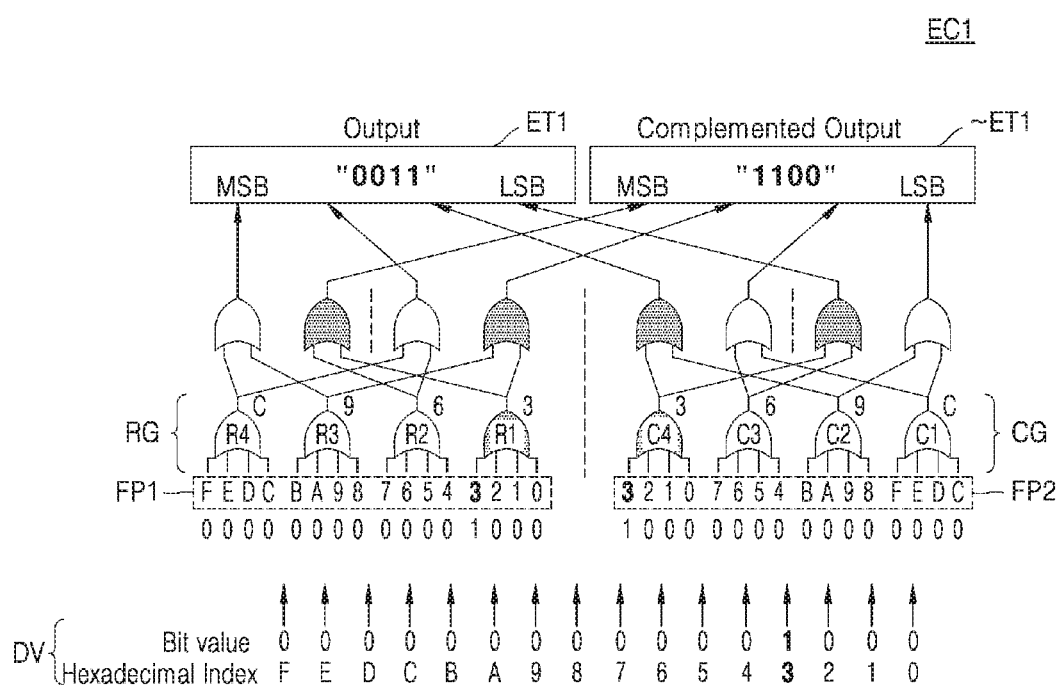
FIGS. 6A and 6B are circuit diagrams illustrating encoder circuits according to an exemplary embodiment of the inventive concept.
Figure 6B:
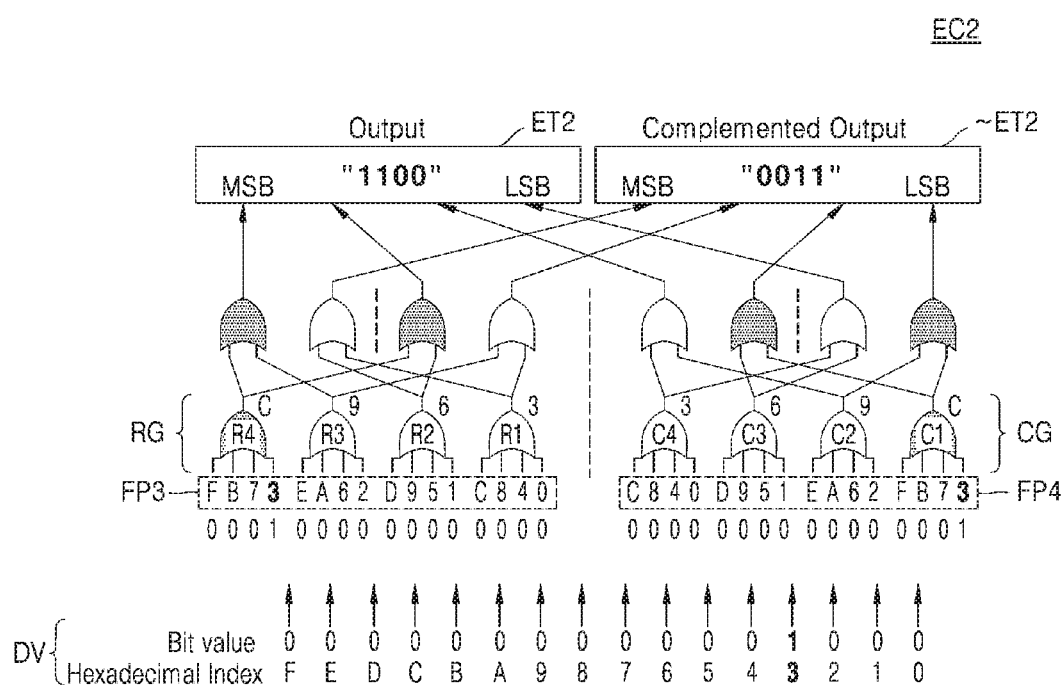

FIGS. 6A and 6B are circuit diagrams illustrating encoder circuits according to an exemplary embodiment of the inventive concept.

Referring to FIG. 6A, the first encoding circuit EC1 may include a digital circuit constituting the first encoder (231 in FIG. 4), and referring to FIG. 6B, a second encoding circuit EC2 may include a digital circuit constituting the second encoder (232 in FIG. 4).

Referring to FIGS. 4 and 6A, the first encoder 231 may include the plurality of row gates RG that receive the first decoding value DV1 and assign the first phenotypes based on a certain Hamming weight value as an output of the plurality of row gates RG. For example, the first phenotypes may include 3, 6, 9, and C in hexadecimal to be output by the first row gate R1, the second row gate R2, the third row gate R3, and the fourth row gate R4, respectively. The first phenotypes may include values assigned based on a certain Hamming weight value. For example, the first phenotypes may include 3, 6, 9, and C in hexadecimal. The first phenotypes may be expressed as 0011, 0110, 1001, and 1100 as binary numbers, and each of the first phenotypes may have a certain Hamming weight value of 2.

In other words, at least one of the first phenotypes and the second phenotypes may have the Hamming weight value of 2 and may be strong against a side channel attack by using uniform Hamming weight values. However, the certain Hamming weight value is not limited to 2, and in some cases, at least one of the first phenotypes and the second phenotypes may include 3, 4, or 5. According to the above example, the first encoder 231 may be implemented with the first encoding circuit EC1 of FIG. 6A, but is not limited thereto, and the second encoder 232 may be implemented with the second encoding circuit (EC2 of FIG. 6B). In addition, the first and second encoders 231 and 232 may be implemented in various forms by a plurality of exemplary embodiments described below. The first encoder 231 may output one of the first phenotypes (for example, 3) assigned to the first row gate R1 as the first encoding value EN1, in response to the first row gate R1 outputting a binary number having a bit value of 1.

Referring to FIGS. 4 and 6B, the second encoder 232 may include the plurality of row gates RG that receive the second decoding value DV2 and assign the second phenotypes based on a certain Hamming weight value as an output of the plurality of row gates RG. According to FIG. 6B, the second phenotypes may include 3, 6, 9, and C in hexadecimal, but may also include 3, 5, A, and C. Similarly, the first phenotypes may also include 3, 5, A, and C in hexadecimal. The second encoder 232 may output one of the second phenotypes (for example, C) assigned to the fourth row gate R4 as the second encoding value EN2, in response to the fourth row gate R4 outputting a binary number having a bit value of 1.

Referring back to FIGS. 5 and 6A, a plurality of indexes may be assigned to the input terminals of the row gates RG in a form of a first index combination FP1. In addition, a plurality of indexes may be assigned to the input terminals of the column gates CG in a form of a second index combination FP2.

The first and second index combinations FP1 and FP2 may include first indexes including 'FEDC', second indexes including 'BA98', third indexes including '7654', and fourth indexes including '3210'. The first indexes may be assigned to input terminals of the fourth row gate R4 and the first column gate C1, the second indexes may be assigned to input terminals of the third row gate R3 and the second column gate C2, the third indexes may be assigned to input terminals of the second row gate R2 and the third column gate C3, and the fourth indexes may be assigned to the first row gate R1 and the fourth column gate C4.

According to an exemplary embodiment of the inventive concept, one of the plurality of row gates RG may output a binary number of a bit value of 1, and the other of the plurality of row gates RG may output a binary number of a bit value of 0. The first encoding circuit EC1 may output one of the phenotypes (for example, 3) as the first-type encoding value ET1 in response to the binary number of a bit value of 1 being output. For example, the first encoding circuit EC1 may output '0011' as the first-type encoding value ET1, and output '1100' as a first-type inverted encoding value ~ET1.

When the encoding value of the bit value of 1 is received by the row gate RG, the first encoding circuit EC1 may output one of the plurality of phenotypes as the first-type encoding value ET1. The phenotype may be a range that the encoding circuit EC may have as an output value. In addition, the first phenotype may correspond to any one of integers in N-decimal (N is a natural number of 1 or more). For example, referring to FIG. 6A, the phenotypes may include 3, 6, 9, and C among integers in hexadecimal. Each of the phenotypes may be assigned to the first row gate R1, the second row gate R2, the third row gate R3, and the fourth row gate R4. For example, when the first row gate R1 to which the phenotype of 3 is assigned receives the bit value of 1 via one of the input terminals of the first row gate R1, the first encoding circuit EC1 may output the phenotype of 3 as the first encoding value EN1. In this case, the decoding value DV input to the input terminals of the first row gate R1 may include a bit value of 1 for a hexadecimal index of 0, a bit value of 1 for a hexadecimal index of 1, a bit value of 1 for a hexadecimal index of 2, or a bit value of 1 for a hexadecimal index of 3. Referring to FIG. 6A, as one of the input terminals of the first row gate R1, the decoding value DV having the bit value of 1 for a hexadecimal index of 3 may be input to one of the input terminals of the first row gate RG1.

The first encoding circuit EC1 may output the first-type encoding value ET1, and for example, the first encoding circuit EC1 may use the first-type encoding value ET1 as the first encoding value EN1. In this case, the first encoding circuit EC1 may be included in the first encoder 231. As another example, the first encoding circuit EC1 may output the first-type encoding value ET1 as the second encoding value EN2. In this case, the first encoding circuit EC1 may be included in the second encoder 232.

Referring to FIG. 6B, a third index combination FP3 and a fourth index combination FP4 may include fifth indexes including 'FB73', sixth indexes including 'EA62', seventh indexes including 'D951', and eighth indexes including 'C840'. The fifth indexes may be assigned to the input terminals of the fourth row gate R4 and the first column gate C1, the sixth indexes may be assigned to the input terminals of the third row gate R3 and the second column gate C2, the seventh indexes may be assigned to the input terminals of the second row gate R2 and the third column gate C3, and the eighth indexes may be assigned to the first row gate R1 and the fourth column gate C4.

Unlike as illustrated in FIG. 6A, when the decoding value DV including the bit value of 1 for the hexadecimal index 3 is input to the second encoding circuit EC2, the fourth row gate R4 and the first column gate C1 may output bit values of 1. In this case, unlike as illustrated in FIG. 6A, the second encoding circuit EC2 may output '1100' as the second-type encoding value ET2, and output '0011' as a second-type inverted encoding value ~ET2. This is because the indexes assigned to the input terminals of the row gates RG and the column gates CG may have been changed.

The second encoding circuit EC2 may output the second-type encoding value ET2, and for example, the second encoding circuit EC2 may output the second-type encoding value ET2 as the first encoding value EN1. In this case, the second encoding circuit EC2 may be included in the first encoder 231. As another example, the second encoding circuit EC2 may output the second-type encoding value ET2 as the second encoding value EN2. In this case, the second encoding circuit EC2 may be included in the second encoder 232.

Referring to FIGS. 4, 6A, and 6B, the first encoding circuit EC1 may include a plurality of row gates RG receiving the first decoding value DV1, and may output the first phenotype (for example, 3) assigned to a row gate (for example, R1) as the first encoding value EN1 in response to the row gate (for example, R1) outputting a binary number including a bit value of 1. In addition, the second encoding circuit EC2 may include the plurality of row gates RG and may output the phenotype (for example, C) assigned to a row gate (for example, R4) as the second encoding value EN2, in response to the row gate (for example, R4) outputting a binary number including a bit value of 1.

Referring again to FIG. 5, the encoding circuit EC may determine the first encoding value EN1 based on the outputs of the row gates RG and the column gates CG. For example, a first most significant bit MSB of the first encoding value EN1 may be a bit value obtained by performing an OR-operation on bit values of the fourth row gate R4 and the third row gate R3. A second most significant bit MSB2 of the first encoding value EN1 may be a bit value obtained by performing an OR-operation on bit values of the fourth row gate R4 and the second row gate R2. A third most significant bit MSB3 of the first encoding value EN1 may be a bit value obtained by performing an OR-operation on bit values of the fourth column gate C4 and the second column gate C2. A least significant bit LSB of the first encoding value EN1 may be a bit value obtained by performing an OR-operation on bit values of the fourth column gate C4 and the third column gate C3.

In addition, the encoding circuit EC may determine the first inverted encoding value ~EN1 based on the outputs of the row gates RG and the column gates CG. For example, a most significant bit MSB of the first inverted encoding value ~EN1 may be a bit value obtained by performing an OR-operation on bit values of the second row gate R2 and the first row gate RE A second most significant bit MSB2 of the first inverted encoding value ~EN1 may be a bit value obtained by performing an OR-operation on bit values of the third row gate R3 and the first row gate RE A third most significant bit MSB3 of the first inverted encoding value ~EN1 may be a bit value obtained by performing an OR-operation on bit values of the third column gate C3 and the first column gate C1. A least significant bit LSB of the first inverted encoding value ~EN1 may be a bit value obtained by performing an OR-operation on bit values of the second column gate C2 and the first column gate C1.

FIG. 7 is a table illustrating encoding values according to an exemplary embodiment of the inventive concept.

Referring to FIGS. 6A, 6B, and 7, each row of the table may indicate the row gates RG, and each column of the table may indicate the column gates CG. '0x0' through '0xF' may be the first encoding values EN1 and/or the second encoding values EN2. In other words, one of the row gates RG may output a bit value of 1, the rest of the row gates RG may output bit values of 0, one of the column gates CG may output a bit value of 1, and the rest of the column gates CG may output bit values of 0. In this case, the encoding circuit EC may output a value corresponding to one among the row gates RG that has output bit values of 1 and one among the column gates CG that has output bit values of 1, as the first encoding value EN1 or the second encoding value EN2.

According to an exemplary embodiment of the inventive concept, when any one of the row gates RG outputs a bit value of 1 and one of the column gates CG outputs a bit value of 1, the encoding circuit EC may be configured such that any one among the '0x0' through the '0xF' is output as the first encoding value EN1 or the second encoding value EN2.

According to an exemplary embodiment of the inventive concept, the first row gate R1 may output a bit value of 1, and the remaining second through fourth row gates R2 through R4 may output bit values of 0. In addition, the fourth column gate C4 may output a bit value of 1, and the remaining first through third column gates C1 through C3 may output bit values of 0. In this case, the encoding circuit EC may output '0x3' as the first encoding value EN1 or the second encoding value EN2.

According to an exemplary embodiment of the inventive concept, the fourth row gate R4 may output a bit value of 1, and the remaining first through third row gates R1 through R3 may output bit values of 0. In addition, the first column gate C1 may output a bit value of 1, and the remaining second through fourth column gates C2 through C4 may output bit values of 0. In this case, the encoding circuit EC may output '0xC' as the first encoding value EN1 or the second encoding value EN2.

FIG. 8 is a table illustrating a first encoding value and a second encoding value, according to an exemplary embodiment of the inventive concept.

Referring to FIGS. 6A, 6B, and 8, when the decoding value DV is input to the encoding circuit EC, the first-type encoding value ET1 and the second-type encoding value ET2 may be output. As described above, the first-type encoding value ET1 may be the first encoding value EN1 or the second encoding value EN2, and the second-type encoding value may be similar to this. In this case, when input data (SB_IN in FIG. 4) is a binary code of four bits, the number of cases (e.g., possible values) of the input data SB_IN may be 16, and accordingly, the number of cases of the decoding values DV may also be 16. In this case, the number of first phenotypes of the first encoder 231 may be four (for example, 0x3, 0x6, 0x9, and 0xC), and the number of second phenotypes of the second encoder 232 may be four (for example, 0x3, 0x6, 0x9, and 0xC). The first encoder 231 may output the first encoding value EN1 including the first phenotypes, and the second encoder 232 may output the second encoding value EN2 including the second phenotypes. For example, for each case in which the first encoding value EN1 may include 3, 6, 9, and C, the second encoding value EN2 may include 3, 6, 9, and C, respectively. The S-box (12 in FIG. 4) may output the first output data (SB_OA of FIG. 4) including 16 cases, by performing an XOR operation on the first-type encoding value ET1 having four cases and the second-type encoding value ET2 having four cases.

Referring to FIGS. 6A, 6B, and 8, when the decoding value DV is 3 (e.g., when the decoding value DV has a bit value of 1 for the hexadecimal index 3), the first row gate R1 and the fourth column C4 included in the first encoding circuit EC1 may output bit values of 1. In addition, the fourth row gate R4 and the first column gate C1 included in the second encoding circuit EC2 may output bit values of 1. Accordingly, the first encoding circuit EC1 may output 3 as the first-type encoding value ET1, and the second encoding circuit EC2 may output C as the second-type encoding value ET2. In the table illustrated in FIG. 8, even if the first-type encoding value ET1 and the second-type encoding value ET2 are interchanged, the same technical idea is applied.

Figure 9:
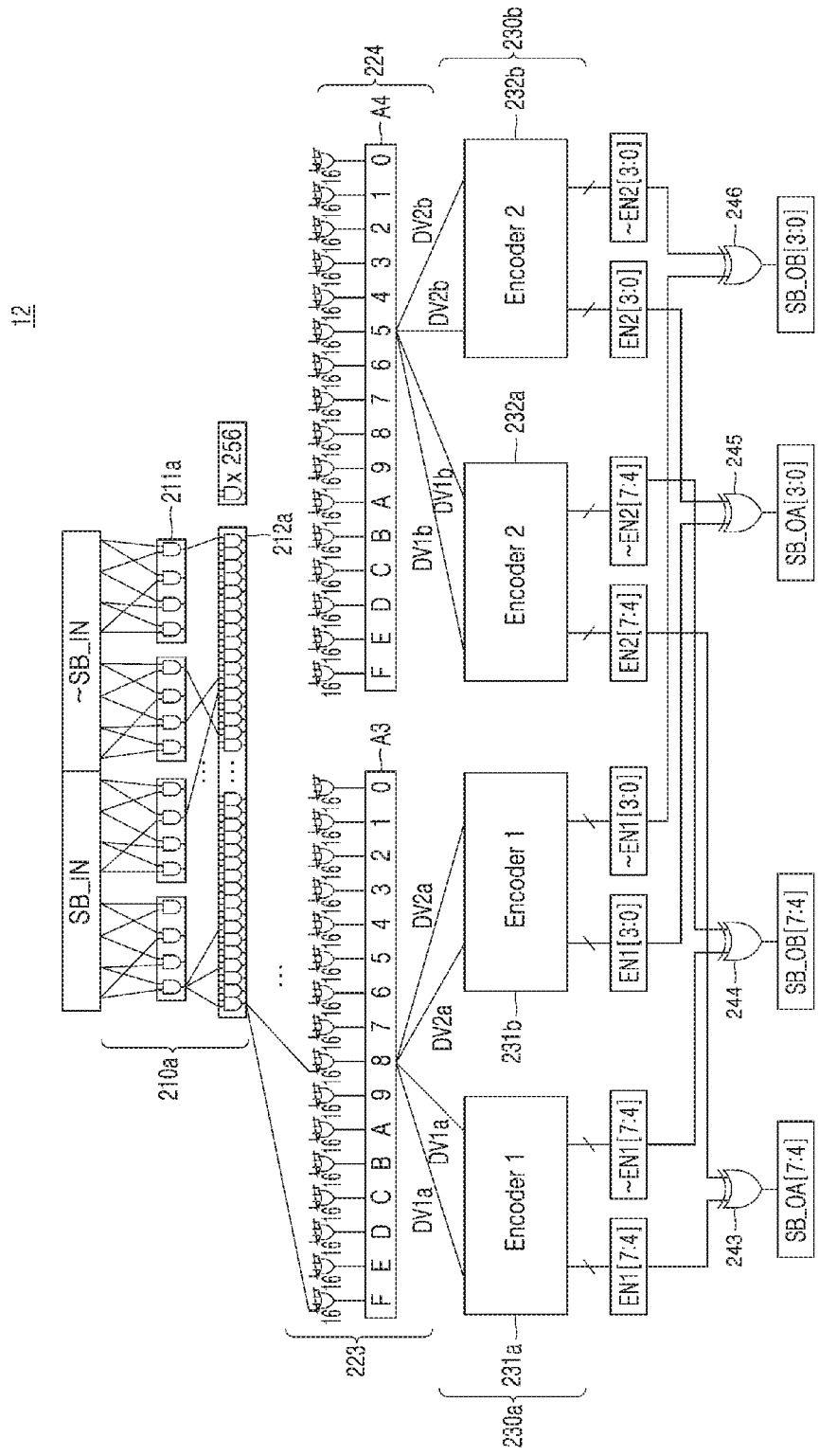
FIG. 9 is a digital circuit diagram illustrating an S-box according to an exemplary embodiment of the inventive concept.

FIG. 9 is a digital circuit diagram illustrating an S-box according to an exemplary embodiment of the inventive concept.

Referring to FIG. 9, first encoders 231a and 231b and the second encoders 232a and 232b may include the above-described encoding circuit EC. The first encoders 231a and 231b may be included in a first encoding module 230a. The second encoders 232a and 232b may be included in a second encoding module 230b. A decoder 210a may include a greater number of gates than decoder 210 described above. For example, a first input gate module 211a may include 16 AND gates corresponding to each of the bits of the input data SB_IN and the inverted input data ~SB_IN. In addition, a second input gate module 212a may include 256 AND gates to decode the input data SB_IN of 8 bits. Each of a third permutation logic 223 and a fourth permutation logic 224 may include 16 AND gates including 16 input terminals, to select one of 16 integers included in each of a third integer group A3 and a fourth integer group A4.

Referring to FIG. 9, the decoder 210a may receive the input data SB_IN and inverted input data ~SB_IN. The input data SB_IN and inverted input data ~SB_IN may each be data including 8 bits. In this case, the first encoder 231a may output a portion of the first encoding value EN1[7:4], and the first encoder 231b may output the rest of the first encoding value EN1[3:0]. In other words, the first encoding module 230a may output the first encoding value EN1. On the other hand, the second encoder 232a may output a portion of the second encoding value EN2[7:4], and the second encoder 232b may output the rest of the second encoding value EN2[3:0]. In other words, the second encoding module 230b may output the second encoding value EN2. Each of the first encoding value EN1 and the second encoding value EN2 illustrated in FIG. 9 may include data of 8 bits, unlike the first encoding value EN1 and the second encoding value EN2 illustrated in the previous drawings.

The portion of the first encoding value EN1[7:4]) may include the first-type encoding value ET1, and the rest (e.g., remaining portion) of the first encoding value EN1[3:0] may include the second-type encoding value ET2. Similar to this case, a portion of the second encoding value EN1[7:4] may include the first-type encoding value ET1, and the rest (e.g., remaining portion) of the second encoding value EN2[3:0] may include the second-type encoding value ET2. In other words, the first encoders 231a and 231b may output different types of encoding values from each other, and the second encoders 232a and 232b may output different types of encoding values from each other.

The first encoding module 230a and the second encoding module 240b may receive decoding values from the third permutation logic 223 and the fourth permutation logic 224, respectively. The first encoders 231a and 231b may share the third permutation logic 223, and the second encoders 232a and 232b may share the fourth permutation logic 224.

The decoder 210a may output decoding signals based on the input data SB_IN and inverted input data ~SB_IN. The third permutation logic 223 may transmit one of the integers included in the third index unit A3 as a first decoding value DV1a to the first encoder 231a, based on a decoding signal received from the decoder 210a. In addition, the third permutation logic 223 may transmit one of the integers included in the third index unit A3 as a second decoding value DV2a to the first encoder 231b, based on the decoding signal.

The fourth permutation logic 224 may transmit one of the integers included in the fourth index unit A4 as a first decoding value DV1b to the second encoder 232a, based on the decoding signal received from the decoder 210a. In addition, the fourth permutation logic 224 may transmit one of the integers included in the fourth index unit A4 as a second decoding value DV2b to the second encoder 232b, based on the decoding signal.

A plurality of logic gates, e.g., XOR gates, may receive the first encoding value EN1 and the second encoding value EN2 and generate the first output data SB_OA and the second output data SB_OB. A third XOR gate 243 and a fifth XOR gate 245 may output the first output data SB_OA by performing an XOR operation on the first encoding value EN1 and the second encoding value EN2. For example, the third XOR gate 243 may perform an XOR operation on a portion of the first encoding value EN1[7:4] and a portion of the second encoding value EN2[7:4]. The fifth XOR gate 245 may perform an XOR operation on the rest (e.g., remaining portion) of the first encoding value EN1[3:0] and the rest (e.g., remaining portion) of the second encoding value EN2[3:0]. In other words, the third and fifth XOR gates 243 and 245 may perform an XOR operation on bits corresponding to the first and second encoding values EN1 and EN2, respectively. Output data EN1[7:0] may be output by combining an output value EN1[7:4] generated by the first encoder 231a with an output value EN1[3:0] generated by the first encoder 231b.

A fourth XOR gate 244 and a sixth XOR gate 246 may output the second output data SB_OB by performing an XOR operation on the first inverted encoding value ~EN1 and the second inverted encoding value ~EN2. The fourth XOR gate 244 may perform an XOR operation on a portion of the first inverted encoding value ~EN1[7:4] and a portion of the second inverted encoding value ~EN2[7:4]. The sixth XOR gate 246 may perform an XOR operation on a portion of the first inverted encoding value ~EN1[3:0] and a portion of the second inverted encoding value ~EN2[3:0]. In other words, the fourth and sixth XOR gates 244 and 246 may perform an XOR operation on bits corresponding to the first and second inverted encoding values ~EN1 and ~EN2, respectively.

FIG. 10 is a table describing a first encoding value and a second encoding value, according to an exemplary embodiment of the inventive concept.

Referring to FIG. 10, the decoding value DV may be a decoding value input to the first encoders 231a and 231b and the second encoders 232a and 232b. For example, the row gates (for example, RG in FIG. 6A) and the column gates (for example, CG in FIG. 6A) included in the first encoders 231a and 231b and the second encoders 232a and 232b may receive the decoding value DV in which a bit value of one index, among the indexes 0 through F, is 1. For example, the decoding value DV including a bit value of 1 in the index 3 may be {0000 0000 0000 1000}.

When the first encoder 231a in FIG. 9 is implemented with the first encoding circuit EC1 of FIG. 6A, and the first encoder 231b in FIG. 9 is implemented with the second encoding circuit EC2 of FIG. 6B, the first encoding value EN1[7:0] illustrated in FIG. 10 may be obtained. In addition, when the second encoder 232a in FIG. 9 is implemented with the first encoding circuit EC1 of FIG. 6A, and the second encoder 232b in FIG. 9 is implemented with the second encoding circuit EC2 of FIG. 6B, the second encoding value EN2[7:0] illustrated in FIG. 10 may be obtained. For example, the first encoder 231a may output one of the phenotypes (for example, 3, 6, 9, and C) as a portion of the first encoding value EN1[7:4], and the first encoder 231b may output one of the phenotypes (for example, 3, 6, 9, and C) as the rest of the first encoding value EN1[3:0]. By combining partial data of the first encoding values output from the first encoder 231a and the first encoder 231b, the first encoding module 230a may output the first encoding value EN1.

FIG. 11 is a table describing a first combination of the phenotypes, according to an exemplary embodiment of the inventive concept.

Referring to FIGS. 4, 9, and 11, a first combination set may include a plurality of combinations (first through twelfth combinations 1-1 through 1-12), the first encoders 231, 231a, and 231b may have phenotypes corresponding to one of the first through twelfth combinations 1-1 through 1-12, and the second encoders 232, 232a, and 232b may have phenotypes corresponding to one of the the first through twelfth combinations 1-1 through 1-12. The left four phenotypes in each combination may be a range of output values that the first encoders 231, 231a, and 231b may output, and the right four phenotypes in each combination may be a range of output values that the second encoders 232, 232a, and 232b may output.

For example, when the first encoders 231, 231a, and 231b have the phenotypes of 1, 5, 9, and D, the second encoders 232, 232a, and 232b may have the phenotypes of 3, 5, A, and C according to the first combination 1-1, or may have the phenotypes of 3, 6, 9, and C according to the fifth combination 1-5.

The combinations of phenotypes described in the table illustrated in FIG. 11 may be to maintain load balance of the row gates (for example, RG in FIG. 5A). The load balance may mean that an average of the indexes assigned to the plurality of input terminals of a certain row gate is uniform with an average of the indexes assigned to the plurality of input terminals of the other row gates. In addition, because each phenotype of the first through twelfth combinations 1-1 through 1-12 has an average Hamming weight value of 2, a side channel attack may be prevented. The Hamming weight may refer to the number of bit values of 1 in a binary bit stream. For example, in the case of the first combination 1-1, because a phenotype of 1 satisfies the Hamming weight of 1, phenotypes of 5 and 9 satisfy the Hamming weight of 2, and the phenotype of D satisfies the Hamming weight of 3, an average of the Hamming weight of a portion of the first encoding value EN1[7:4] output from the first encoders 231, 231a, and 231b, and the Hamming weight of the rest of the first encoding value EN1[3:0] may be 2. In addition, because the Hamming weights of all of the phenotypes of 3, 5, A, and C are 2, an average of the Hamming weight of a portion of the second encoding value EN[7:4] output from the second encoders 232, 232a, and 232b or the Hamming weight of the rest of the second encoding value EN2[3:0] may be 2. The four left phenotypes and the four right phenotypes may include the same technical idea even when they are interchanged.

FIG. 12 is a table describing a second combination set of phenotypes, according to an exemplary embodiment of the inventive concept.

Referring to FIGS. 4, 9, and 12, the second combination set may include a plurality of combinations (first through twelfth combinations 2-1 through 2-12), the first encoders 231, 231a, and 231b may have the phenotypes corresponding to one of the first through twelfth combinations 2-1 through 2-12, and the second encoders 232, 232a, and 232b may have the phenotypes corresponding to one of the the first through twelfth combinations 2-1 through 2-12. The left four phenotypes in each combination may be a range of output values that the first encoders 231, 231a, and 231b may output, and the right four phenotypes in each combination may be a range of output values that the second encoders 232, 232a, and 232b may output.

For example, when the first encoders 231, 231a, and 231b have the phenotypes of 5, 6, 8, and B, the second encoders 232, 232a, and 232b may have the phenotypes of 3, 5, A, and C according to the third combination 2-3, or may have the phenotypes of 3, 6, 9, and C according to the seventh combination 2-7.

The combinations of phenotypes described in the table illustrated in FIG. 12 may maintain the load balance of the column gates (for example, CG in FIG. 5A). The load balance may mean that an average of the indexes assigned to the plurality of input terminals of a certain column gate is uniform with an average of the indexes assigned to the plurality of input terminals of the other column gate. In addition, because each phenotype of the first through twelfth combinations 2-1 through 2-12 has an average Hamming weight value of 2, the side channel attack may be prevented. For example, in the case of the fifth combination 2-5, because a phenotype of 4 satisfies the Hamming weight of 1, phenotypes of 5 and 6 satisfy the Hamming weight of 2, and a phenotype of 7 satisfies the Hamming weight of 3, an average of the Hamming weight of a portion of the first encoding value EN1[7:4] output from the first encoders 231, 231a, and 231b, and the Hamming weight of the rest of the first encoding value EN1[3:0] may be 2. In addition, because the Hamming weights of all of the phenotypes of 3, 6, 9, and C are 2, an average of the Hamming weight of a portion of the second encoding value EN[7:4] output from the second encoders 232, 232a, and 232b or the Hamming weight of the rest of the second encoding value EN2[3:0] may be 2. The four left phenotypes and the four right phenotypes may include the same technical idea even when they are interchanged.

FIG. 13 is a table describing a third combination set of phenotypes, according to an exemplary embodiment of the inventive concept.

Referring to FIGS. 4, 9, and 13, the third combination set may include a plurality of combinations (first through sixteenth combinations 3-1 through 3-15), the first encoders 231, 231a, and 231b may have the phenotypes corresponding to one of the first through sixteenth combinations 3-1 through 3-16, and the second encoders 232, 232a, and 232b may have the phenotypes corresponding to one of the the first through sixteenth combinations 3-1 through 3-16. The left four phenotypes in each combination may be a range of output values that the first encoders 231, 231a, and 231b may output, and the right four phenotypes in each combination may be a range of output values that the second encoders 232, 232a, and 232b may output.

For example, when the first encoders 231, 231a, and 231b have the phenotypes of 1, 7, A, and C, the second encoders 232, 232a, and 232b may have the phenotypes of 3, 6, 9, and C according to the fifth combination 3-5, or may have the phenotypes of 3, 4, A, and D according to the fifteenth combination 3-15.

The combinations of the phenotypes described in the table illustrated in FIG. 13 may maintain the load balance of all of the row gates (for example, RG in FIG. 5A) and column gates (for example, CG in FIG. 5A), and thus may be referred to as good combinations. The load balance may mean that an average of indexes assigned to a plurality of input terminals of a certain row gate and a certain column gate is uniform with an average of indexes assigned to a plurality of input terminals of the other row gates and the other column gates. In addition, because each phenotype of the first through sixteenth combinations 3-1 through 3-16 has an average Hamming weight value of 2, a side channel attack may be prevented. For example, in the case of the fifth combination 3-5, because a phenotype of 1 satisfies the Hamming weight of 1, phenotypes of A and C satisfy the Hamming weight of 2, and a phenotype of 7 satisfies the Hamming weight of 3, an average of the Hamming weight of a portion of the first encoding value EN1[7:4] output from the first encoders 231, 231a, and 231b, and the Hamming weight of the rest of the first encoding value EN1[3:0] may be 2. In addition, because the Hamming weights of all of the phenotypes of 3, 6, 9, and C are 2, an average of the Hamming weight of a portion of the second encoding value EN[7:4] output from the second encoders 232, 232a, and 232b, and the Hamming weight of the rest of the second encoding value EN2[3:0] may be 2. The four left phenotypes and the four right phenotypes may include the same technical idea even when they are interchanged.

According to an exemplary embodiment of the inventive concept, as in the first through eighth combinations 3-1 through 3-8, the second encoders 232, 232a, and 232b may have phenotypes of 3, 5, A, and C, or phenotypes of 3, 6, 9, and C. Because each of phenotypes of 3, 5, A, and C has a Hamming weight of 2, and each of phenotypes of 3, 6, 9, and C has a Hamming weight of 2, the third combination set may be good from a standpoint of having a uniform Hamming weight. On the other hand, when the second encoders 232, 232a, and 232b have phenotypes of 3, 5, A, and C, or phenotypes of 3, 6, 9, and C, the first encoders 231, 231a, and 231b may have phenotypes different from 3, 5, A, and C or phenotypes of 3, 6, 9, and C.

FIGS. 14A and 14B are tables describing output data that are XOR-operated based on encoding values of phenotypes in FIG. 13 according to an exemplary embodiment of the inventive concept.

Referring to FIGS. 4, 9, 14A, and 14B, at least some of first through sixth XOR gates 241 through 246 may perform an XOR operation on a portion of the first encoding value EN1[7:4] and a portion of the second encoding value EN2[7:4]. In addition, at least some of the first through sixth XOR gates 241 through 246 may perform an XOR operation on the rest of the first encoding value EN1[3:0]) and the rest of the second encoding value EN2[3:0]. The XOR-operated value may be one of output data of the S-box 12 (for example, SB_OA and SB_OB).

Referring to the first combination 3-1 in FIG. 14A, by performing an XOR operation on the first encoding value including C (EN1[7:4] or EN2[7:4]) and the first encoding value including C (EN1[3:0] or EN2[3:0]), one of the first through sixth XOR gates 241 through 246 may output data SB_OA representing 0. As another example, referring to the encoding values of the ninth combination 3-1 in FIG. 14A, by performing an XOR operation on the first encoding value including 6 (EN1[7:4] or EN2[7:4]) and the first encoding value including 7 (EN1[3:0] or EN2[3:0]), one of the first through sixth XOR gates 241 through 246 may output data SB_OA representing 0.

FIG. 15 is a table for describing Hamming weights of first and second encoding values and having the phenotypes in FIG. 13 according to an exemplary embodiment of the inventive concept.

Referring to FIG. 15, each of the first and second encoders 231 and 232 may output the first encoding value EN1 and the second encoding value EN2 having phenotypes according to the seventh combination 3-7 in FIG. 13. The first encoding value EN1 may include one of the phenotypes of 3, 5, 8, and E, and the second encoding value EN2 may include one of the phenotypes of 3, 6, 9, and C. In other words, when the phenotypes of the outputs that the first encoding value EN1 and the second encoding value EN2 may have are combined, the S-box 12 may generate 16 kinds of output data (for example, SB_OA). In the seventh combination 3-7, a sum of the Hamming weight HW of the first encoding value EN1 HW(EN1) and the Hamming weight HW of the second encoding value EN2 HW(EN2) may be 3, 4, or 5. In particular, the first encoding value EN1 may have one of the phenotypes of 3, 5, 8, and E, and when the second encoding value EN2 has one of the phenotypes of 3, 6, 9, and C, an average of the sum of the Hamming weights, e.g., HW(EN1)+HW(EN2), may be 4.

On the other hand, each of the first and second encoders 231 and 232 may output the first encoding value EN1 and the second encoding value EN2 having phenotypes according to the fourteenth combination 3-14 in FIG. 13. The first encoding value EN1 may have one of the phenotypes of 3, 5, 8, and E, and when the second encoding value EN2 has one of the phenotypes of 3, 4, A, and D, an average of the sum of the Hamming weights, e.g., HW(EN1)+HW(EN2), may be also 4. Thus, the S-box 12 may have good security against a side channel attack.

Figure 16A:
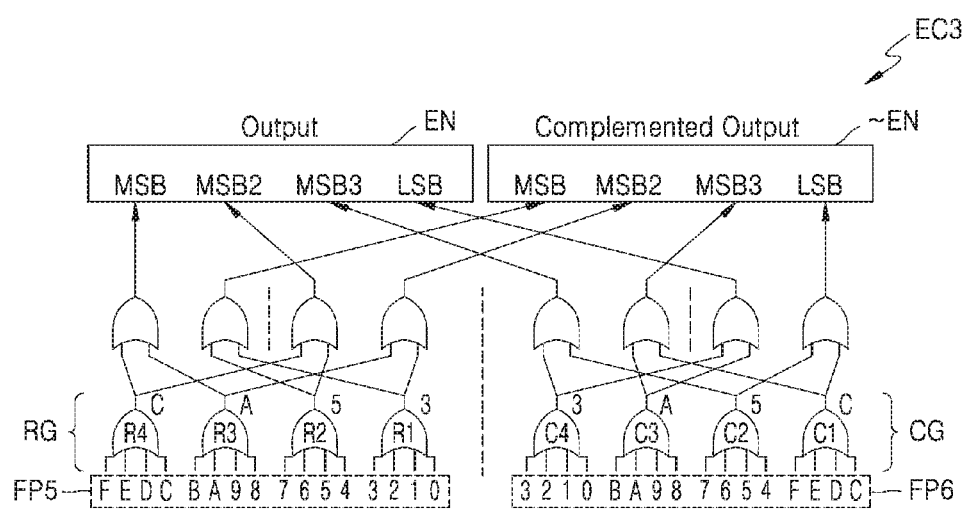
FIGS. 16A and 16B are digital circuit diagrams illustrating encoder modules according to an exemplary embodiment of the inventive concept.
Figure 16B:
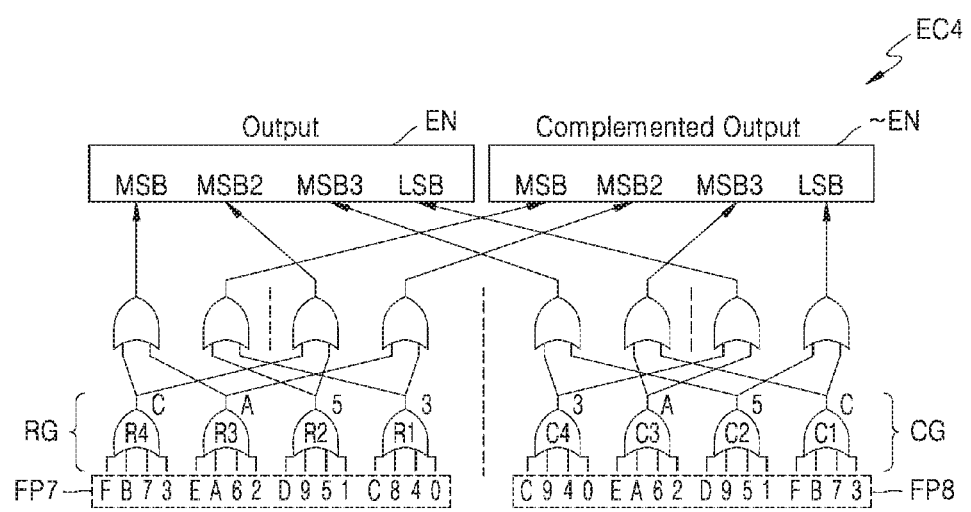

FIGS. 16A and 16B are digital circuit diagrams illustrating encoder circuits according to an exemplary embodiment of the inventive concept.

Referring to FIGS. 4 and 16A, the first encoder 231 may be implemented with a third encoding circuit EC3. In addition, referring to FIGS. 4 and 16B, a second encoder 232 may be implemented with the fourth encoding circuit EC4.

Referring to FIGS. 16A and 16B, one of the phenotypes of 3, 5, A, and C may be assigned to each of the row gates RG, and one of the phenotypes of 3, 5, A, and C may be also assigned to each of the column gates CG. In this case, the encoding value EN may include one of 3, 5, A, and C. For example, the phenotype of 3 may be assigned to the first row gate R1 and the fourth column gate C4, the phenotype of 5 may be assigned to the second row gate R2 and the second column gate C2, the phenotype of A may be assigned to the third row gate R3 and the third column gate C3, and the phenotype of C may be assigned to the fourth row gate R4 and the first column gate C1. In response to the row gates RG and column gates CG outputting a binary number including a bit value of 1, the encoder module (230 in FIG. 3) may output encoding values having the phenotypes respectively assigned to the row gates RG and column gates CG.

Referring to FIG. 16A, a fifth index combination FP5 may be assigned to a plurality of input terminals of the row gates RG. In addition, a sixth index combination FP6 may be assigned to the plurality of input terminals of the column gates CG. The fifth and sixth index combinations FP5 and FP6 may include first indexes including 'FEDC', second indexes including 'BA98', third indexes including '7654', and fourth indexes including '3210'. The first indexes may be assigned to the fourth row gate R4 and the first column gate C1, the second indexes may be assigned to the third row gate R3 and the third column gate C3, the third indexes may be assigned to the second row gate R2 and the second column gate C2, and the fourth indexes may be assigned to the first row gate R1 and the fourth column gate C4. For example, when the decoding value DV including a bit value of 1 for the index A is received, the third encoding circuit EC3 may output, as the encoding value EN, '1010' indicating the phenotype of A.

Referring to FIG. 16B, a seventh index combination FP7 may be assigned to a plurality of input terminals of the row gates RG. In addition, an eighth index combination FP8 may be assigned to the plurality of input terminals of the column gates CG. The seventh index combination FP7 and the eighth index combination FP8 may include the fifth indexes including 'FB73', the sixth indexes including 'EA62', the seventh indexes including 'D951', and the eighth indexes including 'C840'. The fifth indexes may be assigned to the fourth row gate R4 and the first column gate C1, the sixth indexes may be assigned to the third row gate R3 and the third column gate C3, the seventh indexes may be assigned to the second row gate R2 and the second column gate C2, and the eighth indexes may be assigned to the first row gate R1 and the fourth column gate C4. For example, when the decoding value DV including a bit value of 1 for the index D is received, the fourth encoding circuit EC4 may output, as the encoding value EN, '0101' indicating the phenotype of 5.

The term 'module' may refer to software, or a hardware component such as a field programmable gate array (FPGA) or an application specific integrated circuit (ASIC), and the 'module' may perform certain roles. However, the 'module' is not limited to software or hardware. The 'module' may be configured to reside in an addressable storage medium and may be configured to play back one or more processors. Accordingly, the 'module' may include, for example, components such as software components, object-oriented software components, class components, task components, processes, functions, procedures, subroutines, segments of program code, drivers, firmware, microcode, circuits, data, databases, data structures, tables, arrays, or variables. Functions provided in the components and the 'modules' may be combined into a smaller number of components and 'modules', or may be further separated into additional components and 'modules'.

While the inventive concept has been particularly shown and described with reference to exemplary embodiments thereof, it will be understood by those of ordinary skill in the art that various changes in form and details may be made thereto without departing from the spirit and scope of inventive concept as set forth by the following claims.

What is claimed is:

1. A security circuit comprising:
    a decoder configured to receive input data and output a decoding signal in response to the input data;
    a first encoder configured to output one of first phenotypes corresponding to any one among integers in N-decimal (N is a natural number of 1 or more) as a first encoding value in response to the decoding signal;
    a second encoder configured to output one of second phenotypes corresponding to any one among integers in N-decimal as a second encoding value in response to the decoding signal; and
    a gate module circuit configured to generate output data by performing a logic operation on the first encoding value and the second encoding value,
    wherein the first encoder comprises a plurality of row gates,
    each of the first phenotypes is assigned to one of the plurality of row gates,
    one of the plurality of row gates to which one of the first phenotypes is assigned outputs a first binary number having a bit value of 1,
    the rest of the plurality of row gates output a second binary number having a bit value of 0, and
    the first encoder outputs one of the first phenotypes as the first encoding value in response to the one of the plurality of row gates outputting the first binary number.

2. The security circuit of claim 1, further comprising a permutation logic circuit configured to select one of a plurality of integers based on the decoding signal and output the selected integer as a decoding value to the first encoder and the second encoder.

3. The security circuit of claim 1, further comprising:
    a first permutation logic circuit configured to select a first integer among a plurality of integers based on the decoding signal and output the first integer as a first decoding value to the first encoder; and
    a second permutation logic circuit configured to select a second integer among the plurality of integers based on the decoding signal and output the second integer as a second decoding value to the second encoder.

4. The security circuit of claim 1, wherein the gate module circuit comprises an XOR gate, and
    the output data is a result of an XOR operation on the first encoding value and the second encoding value by using the XOR gate.

5. The security circuit of claim 2, wherein
    each of the plurality of row gates comprises a plurality of first input terminals, and
    one of the plurality of first input terminals receives the decoding value.

6. The security circuit of claim 5, wherein the second encoder comprises a plurality of column gates,
    each of the plurality of column gates comprises a plurality of second input terminals, and
    one of the plurality of second input terminals receives the decoding value.

7. The security circuit of claim 1, wherein the output data is a combination of a first portion comprising the first encoding value and a second portion comprising the second encoding value.

8. The security circuit of claim 1, wherein the first encoding value or the second encoding value has a Hamming weight of 2.

9. The security circuit of claim 8, wherein the first phenotypes or the second phenotypes comprise 3, 5, A, and C in hexadecimal, or 3, 6, 9, and C in hexadecimal.

10. The security circuit of claim 1, wherein a sum of a Hamming weight of the first encoding value and a Hamming weight of the second encoding value is 3, 4, or 5.

11. A security circuit comprising:
    a first permutation logic circuit configured to output a first decoding value;
    a second permutation logic circuit configured to output a second decoding value;
    a first encoder comprising a plurality of first row gates configured to receive the first decoding value, wherein the first encoder is assigned with first phenotypes based on a certain Hamming weight value as an output of the plurality of first row gates and is configured to output one of the first phenotypes assigned to one of the plurality of first row gates as a first encoding value in response to a binary number having a bit value of 1; and
    a second encoder comprising a plurality of second row gates configured to receive the second decoding value, wherein the second encoder is assigned with second phenotypes based on a certain Hamming weight value as an output of the plurality of second row gates and is configured to output one of the second phenotypes assigned to one of the plurality of second row gates as a second encoding value in response to a binary number having a bit value of 1.

12. The security circuit of claim 11, further comprising a gate module circuit configured to output first output data by performing an XOR operation on the first encoding value and the second encoding value.

13. The security circuit of claim 12, wherein the gate module circuit outputs second output data by performing an XOR operation on a first inverted encoding value and a second inverted encoding value.

14. The security circuit of claim 11, wherein the first phenotypes and the second phenotypes are preset so that input data and output data are mapped one-to-one.

15. The security circuit of claim 11, wherein the first phenotypes or the second phenotypes are 3, 6, 9, and C in hexadecimal.

16. The security circuit of claim 11, wherein the first phenotypes or the second phenotypes are 3, 5, A, and C in hexadecimal.

17. The security circuit of claim 11, wherein at least one of the first phenotypes and the second phenotypes comprises a value having a Hamming weight of 2.

18. A security circuit comprising:
    a decoder configured to receive input data and output a decoding signal in response to the input data;
    a first encoder configured to output one of first phenotypes corresponding to any one among integers in N-decimal (N is a natural number of 1 or more) as a first encoding value in response to the decoding signal;

a second encoder configured to output one of second phenotypes corresponding to any one among integers in N-decimal as a second encoding value in response to the decoding signal; and a gate module circuit configured to generate output data by performing a logic operation on the first encoding value and the second encoding value, wherein the first phenotypes or the second phenotypes comprise 3, 5, A, and C in hexadecimal, or 3, 6, 9, and C in hexadecimal, and/or a sum of a Hamming weight of the first encoding value and a Hamming weight of the second encoding value is 3, 4, or 5.

* * * * *